United States Patent [19]
Umemoto

[11] Patent Number: 5,671,072
[45] Date of Patent: Sep. 23, 1997

[54] IMAGE FILM DEVELOPER FOR PRINTING CHANGED FILM IMAGE DATA AND IMAGE DATA CHANGE CONDITION

[75] Inventor: Choji Umemoto, Wakayama, Japan

[73] Assignee: Noritsu Koki Co., Ltd., Wakayama, Japan

[21] Appl. No.: 531,268

[22] Filed: Sep. 20, 1995

[30] Foreign Application Priority Data

Sep. 21, 1994 [JP] Japan ................................. 6-226983

[51] Int. Cl.$^6$ ................................................ H04N 1/50
[52] U.S. Cl. .......................... 358/501; 358/506; 358/527
[58] Field of Search .............................. 358/527, 537, 358/501, 504, 487, 452, 406, 506

[56] References Cited

U.S. PATENT DOCUMENTS 4,751,583  6/1988  Levine ..................................... 358/452
4,979,032  12/1990  Alessi et al. ............................ 358/527

*Primary Examiner*—Scott A. Rogers
*Attorney, Agent, or Firm*—Wenderoth, Lind & Ponack

[57] ABSTRACT

Film image processing equipment enables, before printing, exposure conditions to be changed in order to produce authentic color reproductions. Each film has a particular color characteristic or bias which can be cancelled to produce authentic color reproductions. The film characteristic is detected statistically and is used as part of the change required to the exposure conditions to produce authentic reproduction.

2 Claims, 6 Drawing Sheets

IMAGE FILM DEVELOPER FOR PRINTING CHANGED FILM IMAGE DATA AND IMAGE DATA CHANGE CONDITION

FIELD OF THE INVENTION

This invention relates to devices for adjusting an quality of the image to a desired condition while the image is on a monitor, without using a printer.

BACKGROUND OF THE INVENTION

Conventionally, development equipment is equipped with a scanner to effect the appropriate exposure condition, and based on that exposure condition printing will take place. This equipment is commonly employed by developers (i.e. developing stores and businesses) and therefore the photographer cannot make adjustments before printing.

The problem that this invention addresses is as follows. If the photographer finds that the printed image is unsatisfactory, he must return, with additional change information, to the developer and ask for another print. Therefore, not only is the first print wasted, the above described procedure must be repeated until the desired result is achieved. This method is inefficient and time-consuming. Furthermore, after many attempts to finally obtain a satisfactory result, the process may be not repeatable at a later date if more prints then are desired.

Printing will be on printing paper and therefore, a big developing device is needed and therefore it is difficult to easily obtain prints.

SUMMARY OF THE INVENTION

According to this invention, the photographer himself is able to designate certain exposure conditions and request accordingly to the developer. This invention provides such a device.

According to the first embodiment, there is a film image developer comprising:

reading means for reading film image data; means for setting a standardized condition based on a standardized image data change condition; correction means for correcting the standardized image data change condition; image data change means for changing the read film image data, based on the image data change condition; display means for displaying changed image data; and output means for outputting the image data change condition.

According to the second embodiment, there is a film image developer comprising:

reading means for reading film image data; means for setting a standardized condition based on a standardized image data change condition; correction means for correcting standardized image data change condition; image data change means for changing the read film image data, based on the image data change condition; additional information input means for inputting additional information; edit designation means for designating editing of changed image data; editing means for editing changed image data based on edit designations; display means for displaying edited changed image data and additional information; and output means for outputting edited changed image data and additional information together.

It is possible to display the image based on the desired film image change condition. According to the first embodiment, this is accomplished by reading film image data and then correcting it with appropriate a pre-set standardized film image change condition. The change is based on this pre-set standardized film image change condition. Thus if input is based on the film image change condition, then one is able to get a desired image efficiently at any time.

According to the second embodiment, there is additional input means to input additional information and also editing means and is capable of displaying the additional information. Therefore, the desired editing can be accomplished easily. The edited image data with said additional information, is outputted to the printer.

BRIEF DESCRIPTION OF THE DRAWINGS

Preferred embodiments of the invention will be described in conjunction with the following FIGS.

DETAILED DESCRIPTION OF A PREFERRED EMBODIMENT

Figure 1:
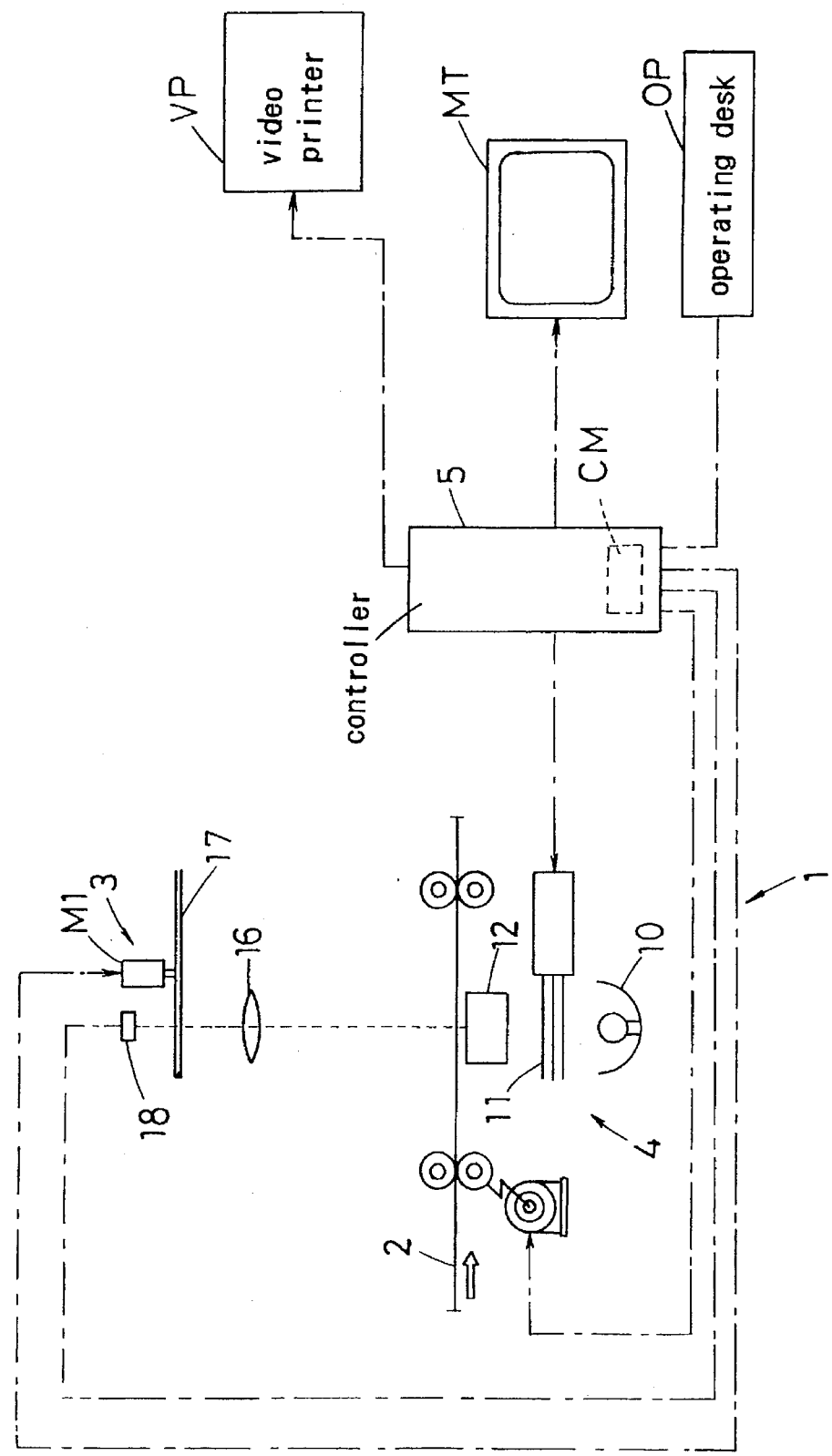
FIG. 1 is a functional diagram of film image developing equipment which employs the invention.

As shown in FIG. 1, there is a film image developer 1, film 2 to be developed, reading device 3 for reading images of film 2, projection exposure device 4 for exposing film 2 onto reading device 3, and controller 5 which controls the above.

Controller 5 is connected to operating console or desk OP for various inputs and mode selection, to monitor MT to display image dam and to video printer VP to output images.

Figure 2:
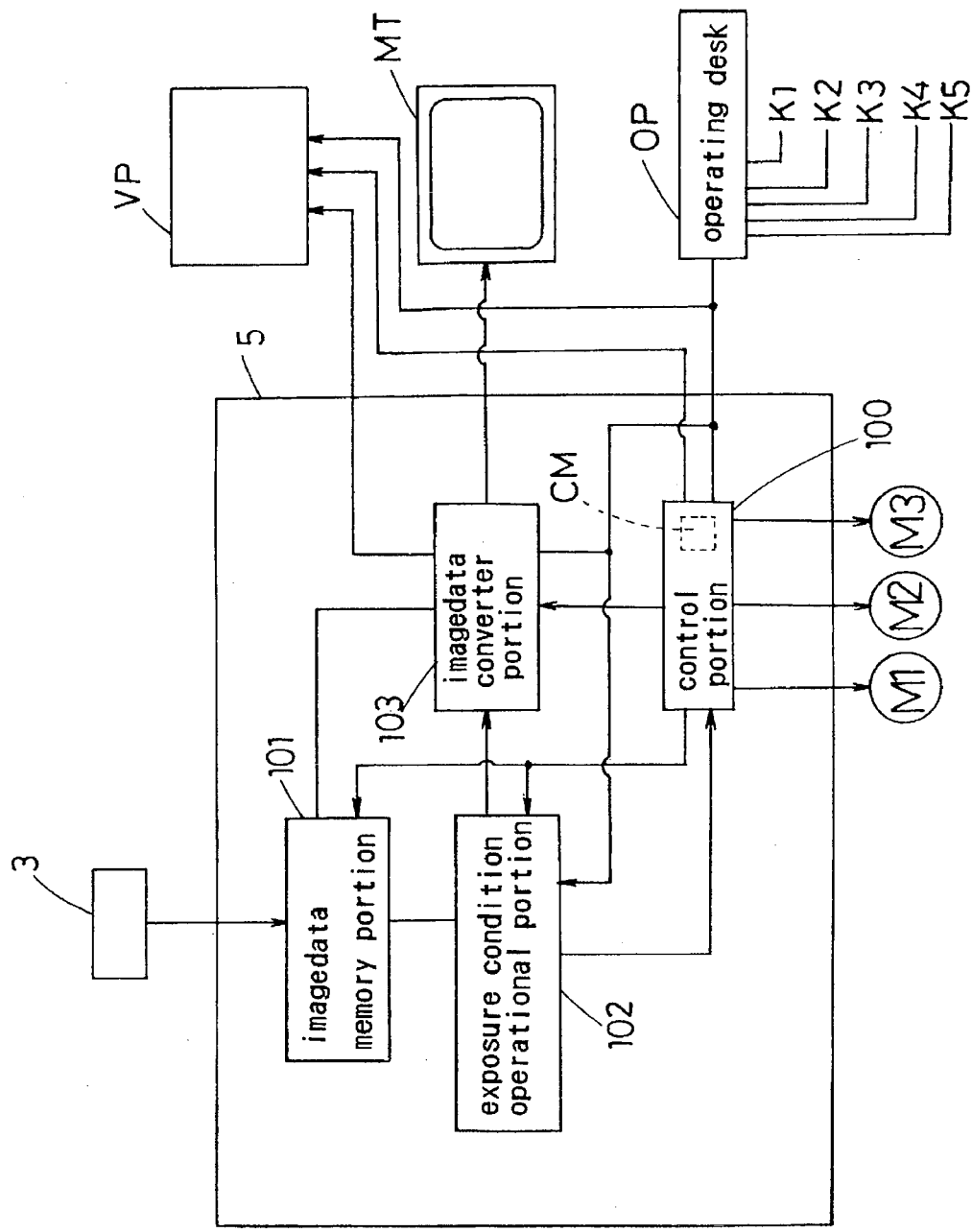
FIG. 2 is a block diagram of and around the controller according to this invention.

As shown in FIG. 2, controller 5 will be explained further. Controller 5 includes:

image dam memory 101 which stores image dam read by reading device 3;

exposure calculator or operator 102 which calculates exposure condition after reading information from image data memory 101 and displays on monitor MT the required exposure condition as calculated by exposure operator 102;

image data converter 103 which converts the treated image data, which is outputted to the video printer VP memory device CM which memorizes said exposure condition and said treated image data: and controller 100 which controls the above.

Image data memory 101 has the capacity to memorize enough image data for one roll of film 2 read by CCD image sensor 18. Therefore, several frames of image data can be displayed together on monitor MT. And also, one can print or display according to the read order, reverse order or any desired order.

Once image data memory 101 accumulates the image data of one roll of film 2, exposure operator 102 subdivides all frames and then statistically characterizes that particular roll of film in its expression of colors. The brightness or concentration of each base color (Red, Green and Blue) is determined according to the amount of light emitted by the photographed object.

Exposure operator 102 seeks to determine the exposure condition of each image frame. First is determined the average brightness, i.e. average amount of light emitted by the photographed objects. Then, based on that average brightness and said characteristics of that particular film (which contains base colors), exposure operator 102 determines the color expression of each frame. Each film is biased towards certain colors. This invention tries to remove or cancel the bias so as to create authentic expressions of color.

It is possible to correct the exposure condition by increasing or decreasing the exposure amount of the colors, Y (Yellow), M (Magenta) or C (Cyan). The device to increase or decrease is accomplished by indicator key K2 connected to operator desk OP (explained later) which directs average increase or decrease of the amount of exposure according to change in brightness of the photographs.

Once there is an indication to correct, the exposure operator 102 will calculate the appropriate change in exposure conditions to arrive at new exposure conditions.

But, like in a panorama image, when the X,Y (horizontal, vertical) ratio is quite different than a conventional image, it will calculate according to the new X,Y ratio.

Image data converter 103 memorizes calculating formula to process conversion treatment (such as negative-positive conversion) of image data read by image data memory 101. Image data converter 103 is capable of changing its formula based on various parameters according to exposure conditions read by exposure operator 102.

Image data input into image data converter 103 becomes "treated" data after modification based on the above formula so that the printed outcome and color expression will be roughly equivalent to that of image data of monitor MT or output from video printer VP.

Furthermore, the following steps are performed:
the simultaneous display of image data of several frames;
the output of "index print" to video printer VP;
the display of the amalgamation of the above image data with additional information from controller 100, thus treated, is conveyed to monitor MT and video printer VP in the form of an analog or digital RGB video signal.

If exposure operator 102 seeks a new exposure condition directed by operating desk OP, image data converter 103 then converts image data based on newly required exposure condition. This results in "treated" image data.

If a "no need to adjust" signal is inputted at the operating desk OP desk, then the first exposure is used.

Projection exposure part 4 is equipped with light source 10, filter 11 for adjusting the balance of light colors from light source 10 on film 2, and mirror tunnel 12 which uniformly mixes colors of the light going through filter 11. The conveyance path of film 2 is equipped with conveying rollers and is controlled by controller 5.

Reading means 3 is provided with lens 16, rotary color filter 17 with Red, Green and Blue color filter arranged circumferentially, and a motor M1 to operate color filter 17, and CCD image sensor 18. Image data of film 2 leads to image formation on reception screen of CCD image sensor 18 (through lens 16) which in turn detects image data of film 2 in RGB fractions (through rotary color filter 17).

Operating desk OP is equipped with
K1 mode key (to corrected or not yet corrected mode)
K2 to indicate exposure condition and brightness adjustment
K3 to move cursor
K4 to enlarge, reduce, trim, rotate image layout
K5 is the number of prints or frames, additional text information
K6 is to indicate completion of the particular setup or to proceed to next treatment.

Monitor MT displays treated and completed image data as designated by operating desk OP and through input from controller 5.

It is possible to display in several modes.
(1) mode which displays image data of six frames (shown in FIG. 3)
(2) mode which displays image data of 28 frames
(3) mode which displays image data of 40 frames
(4) a cinema mode. As shown in FIG. 4, seven frames of image data are displayed in the top portion of the monitor and there is an enlarged cinema-view mode of one frame selected from the seven frames in the center of the monitor display. Other modes for any desired layout as designated by operating desk OP are also possible.

Figure 3:
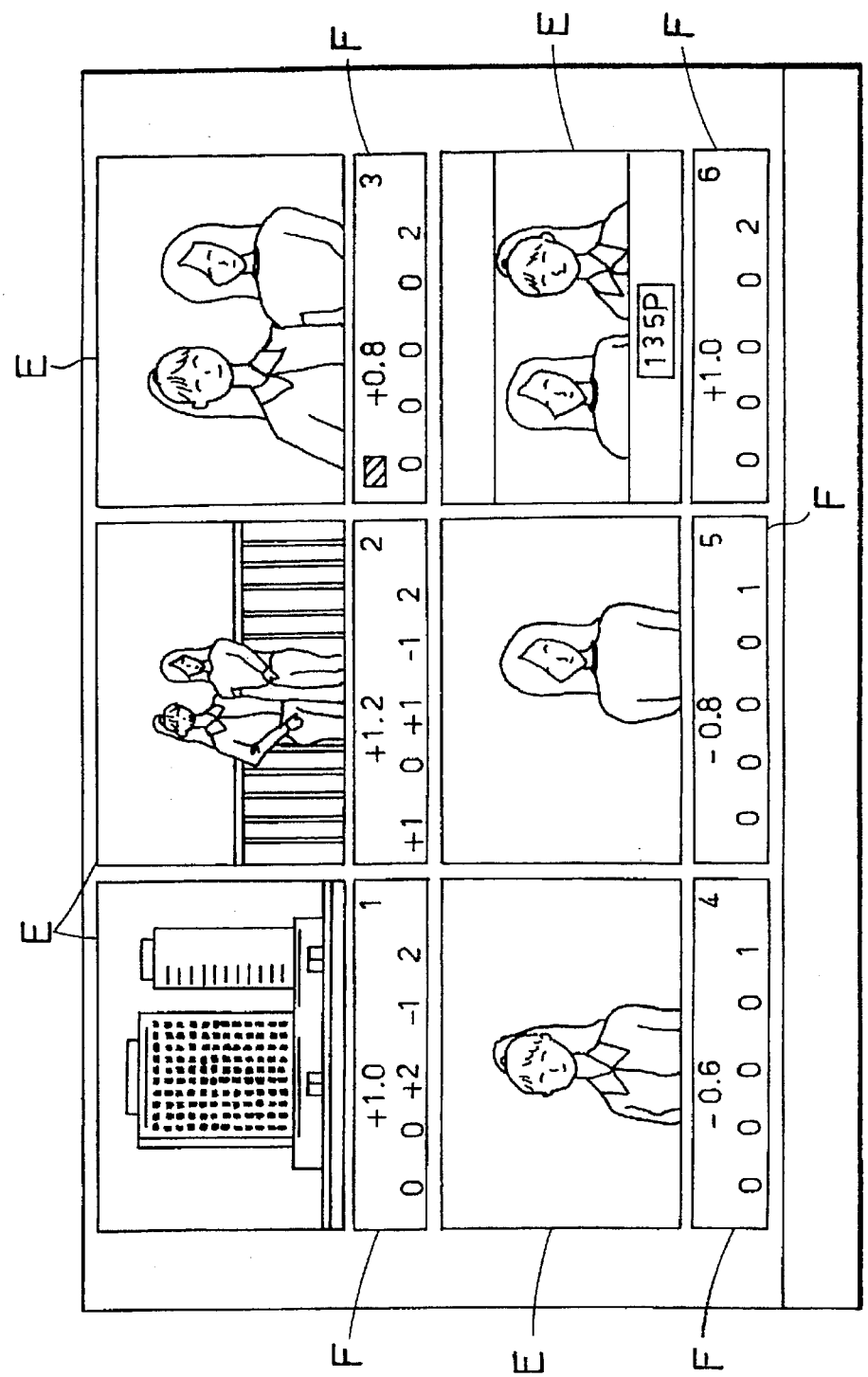
FIG. 3 shows the six-frame mode of display.
Figure 4:
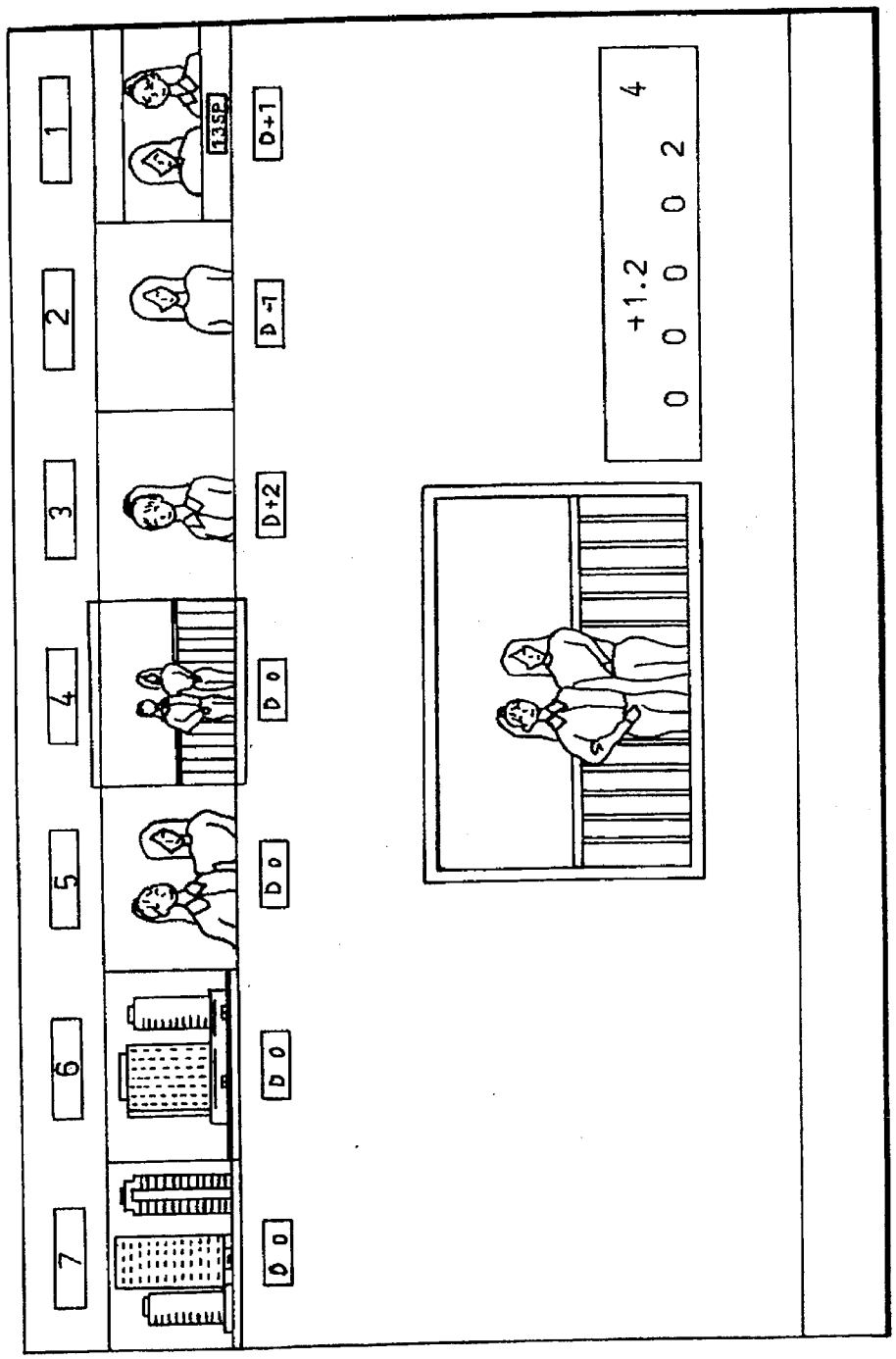
FIG. 4 shows the cinema mode of display.

In each of 6-frame mode, 28-frame mode and cinema-view mode, there is an E image zone showing image data of each frame and F information zone showing frame number, correction data, etc (FIG. 3).

Figure 5:
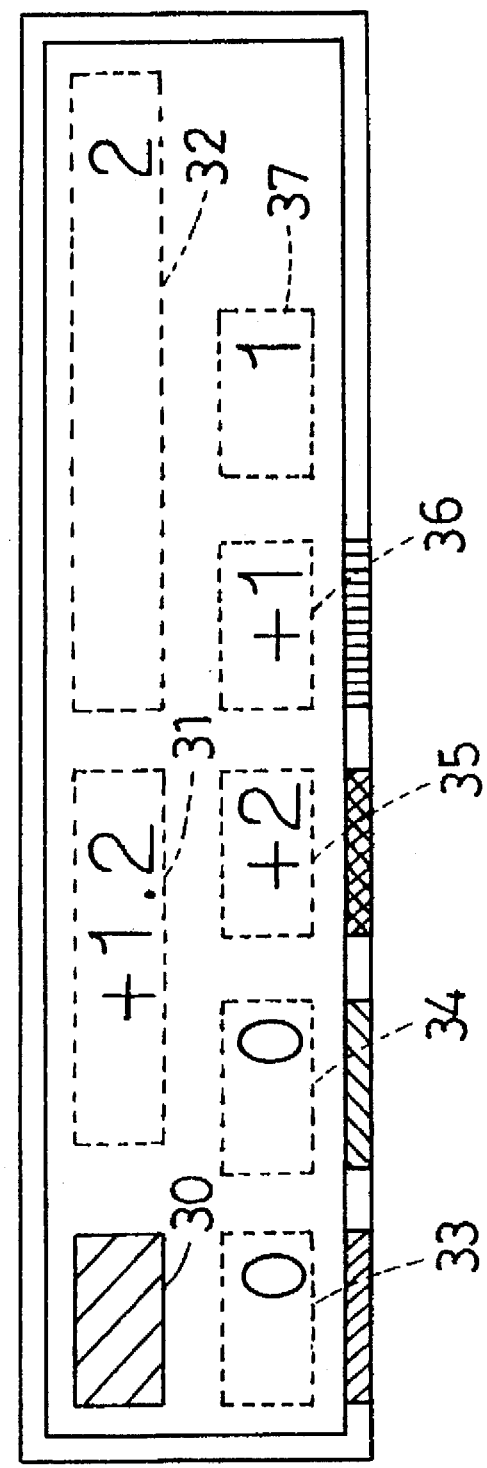
FIG. 5 shows an enlarged portion of the monitor display.

As shown in FIG. 5, in information zone F, there are:
(1) cursor sector 30 indicating that this particular frame is now under the target of operating desk OP correction measures;
(2) brightness display sector 31 indicating average brightness value read from image sensor 18;
(3) frame number display sector 32;
(4) correction value indicator sector 33 for Y color;
(5) correction value indicator sector 34 for M color;
(6) correction value indicator sector 35 for C color;
(7) brightness value indicator 36 for correction of the brightness based on the average increase or decrease of the exposure quantity; and
(8) prints number indicator 37 displays number of prints as inputted by operating desk OP.

Figure 6:
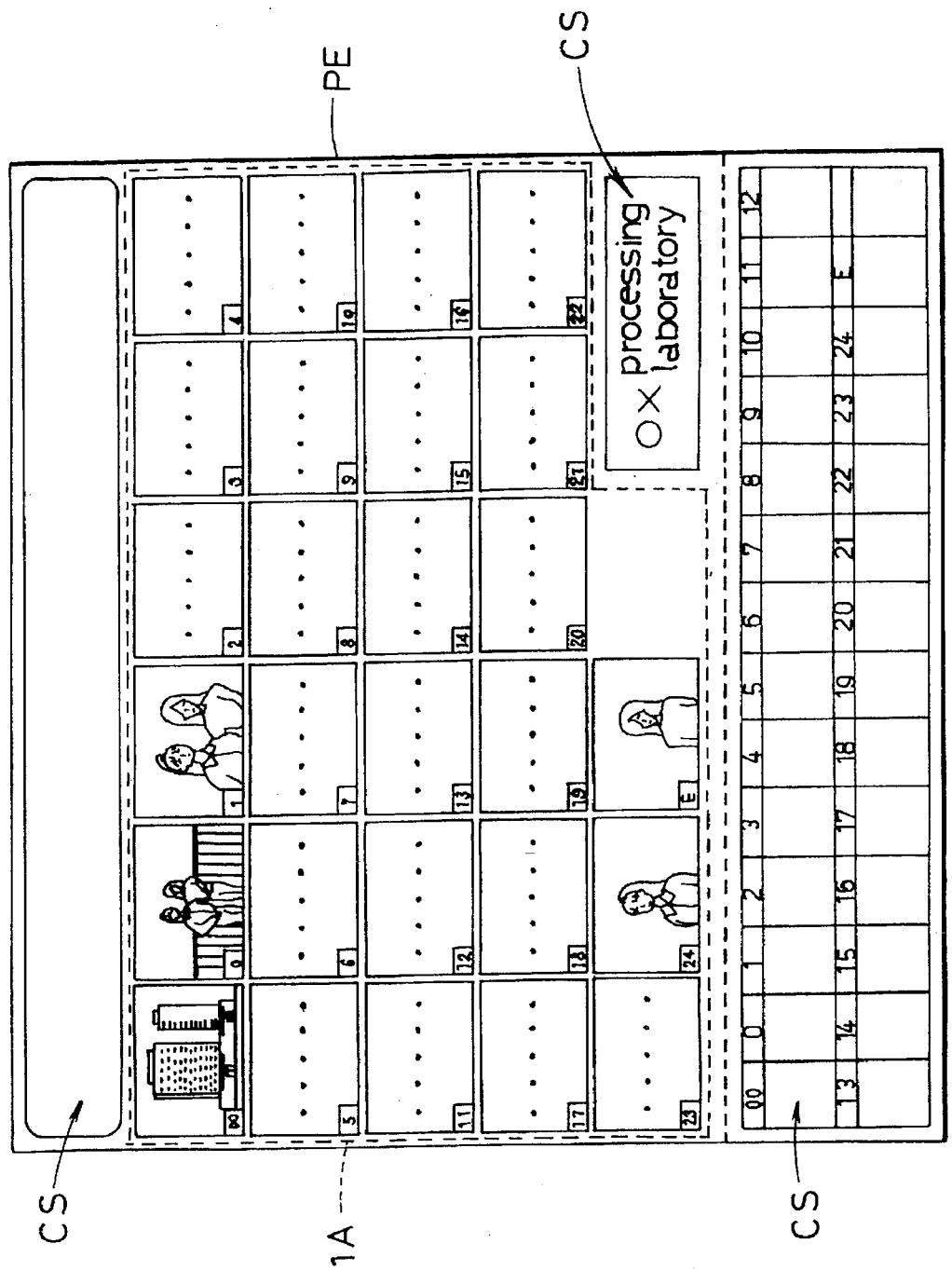
FIG. 6 shows an example of the index print sheet.

Video printer VP prints on index print sheets PE based on treated image data and additional information as input by controller 5 (as shown in FIG. 6).

In the index print sheets PE, there are image-letter zone IA showing treated image data and additional information text sector CS showing letter input from operating desk OP and memory CM and/or logo mark and other graphic information.

In zone IA, not all frames are displayed. Certain frames specified by operating desk OP or as by the image data converter 103 as being excessively of high or low brightness (under or over exposure) can be excluded from the printed information display.

Additional information that can be printed in sector CS include, for example,
(1) manufacturer of print sheets PE,
(2) its address, tel# or logo mark,
(3) date of manufacture, identification signs,
(4) title such as "Camp", "First day at school", "First visit to the Shrine", etc. together with frame #, exposure brightness data, brightness correction data.

This data can be extracted from memory CM or be input from operating desk OP or read from magnetic disk or through a communication circuit. Or one may leave a part of sector CS blank which can be pencilled or penned in at any time.

And one may also print additional information on a gummed label or even bar codes, or be converted to magnetic information and recorded on magnetic sheet.

In memory CM, one may obtain flexible magnetic disk with desired information (such as treated image data through input by video printer VP and additional information) by inserting it into the appropriate slot.

In an example of operation, first, when composing index print sheet PE, there is memorized all additional information that needs to be printed on sector CS selected from memory CM or inputted from operating desk OP. Next reading means 3 is operated and the image data of all frames, frame # and DX code are stored in image data memory 101.

Next exposure condition is calculated in image data memory 101 of the uncorrected mode after the above-mentioned calculation. Image change will take place at image data converter 103 and then will be printed by video printer VP together with the treated image and additional information. This is subject to further correction.

The above-described "treated" image data will be displayed on the monitor MT in either 6-frame or 28-frame mode. While watching monitor MT, one places correction input on each frame. Once input is in place, the exposure condition will be re-calculated, then correction made in image data converter 103 and new and corrected "treated" image data will be displayed on monitor MT.

When the correction process is completed, then corrected data will be stored in the memory. Before completion of the entire group of frames, correction can be made over and over.

Thus, correction can be made repeatedly before data is actually printed and therefore is much more efficient and expedient to meet the requirements and desire of the photographer.

In this example, a case of individual frame corrections was used. But one may use any number of frames for the same purpose or even convert from color to black and white and or one may change the background to white. One may use such image for licence or passport applications if adjusted to the appropriate size.

For reading, one may use a CCD line sensor or an MOS image sensor instead of a CCD image sensor. Or one may obtain image data for each of Red, Green, Blue components and setting the CCD image sensor for each color.

And one may do conversion of separately treated image data to be displayed on monitor MT from the same to be inputted from video printer VP, but also a video signal input to MT can be directly input to video printer VP.

As for video printer VP, the following are desirable: heat transfer, thermosensitive, CRT or laser beam, inkjet, electrostatic method of color printing. For a monochromatic printer, half-tone capacity is desirable.

Like the CRT printer capable of printing directly on printing paper, printing treated image data and index printing directly on the paper is possible.

The result may be stored in hard disk apparatus or a compact disc (magnetic/photomagnetic memory device).

As an interface for the input device, SCS1-2 or RS232C are desirable to increase wider use.

This invention can be attached to a photographic developer device that does not have the capability to calculate the exposure condition, and leads to automation of correction of exposure conditions which was previously manually done.

With this monitor, one can see the film image, not as a negative but in the same condition as a positive identical with a real print.

One may obtain index points with printers. That is, small film development stores, and film developing businesses generally do not have to purchase a printer capable of printing index prints.

With a photograph developer according to the first embodiment of this invention, one may correct and adjust a image data change condition while watching the monitor MT display. Thereby the desired image is obtained with input based on the image data change condition. In other words, without actually printing, one can easily confirm, in effect, the print condition. And similar prints may be obtained repeatedly or as often as desired.

A photographic developer according to the second embodiment of this invention, in addition to the above-mentioned features, is capable of editing and thereby enlarging, reducing, trimming, rotating or arranging the layout of several frames. Therefore, one can get prints in various different forms with additional information printed. Titles, captions, etc. may also be on the prints.

While a particular embodiment of the invention has been disclosed, it is to be understood that various different modifications are possible and are contemplated as being within the true spirit and scope of the claims.

I claim:

1. A film reading image developer comprising:

(a) reading means for reading film image data;

(b) means for setting a standardized condition based on a standardized image data change condition;

(c) correction means for correcting the standardized image data change condition;

(d) image data change means for changing the read film image data, based on the corrected image data change condition; and (e) output means for printing the changed film image data and the image data change condition together on a sheet.

2. A film image developer comprising:

(a) reading means for reading film image data;

(b) means for setting a standardized condition based on a standardized image data change condition;

(c) correction means for correcting the standardized image data change condition;

(d) image data change means for changing the read film image data, based on the corrected image data change condition;

(e) additional information input means for inputting additional information;

(f) edit designation means for designating editing of changed image data;

(g) editing means for editing changed image data based on edit designations; and (h) output means for printing the edited changed image data, the image data change condition and the additional information together on a sheet.

* * * * *